United States Patent [19]

Brennan et al.

[11] 4,146,578
[45] Mar. 27, 1979

[54] HYPOCHLOROUS ACID PROCESS

[75] Inventors: James P. Brennan, Wallingford; John A. Wojtowicz, Cheshire; Preston H. Campbell, Waterbury, all of Conn.

[73] Assignee: Olin Corporation, New Haven, Conn.

[21] Appl. No.: 864,430

[22] Filed: Dec. 27, 1977

[51] Int. Cl.² .................. C01B 11/04; C01B 11/06
[52] U.S. Cl. ................... 423/473; 423/474; 423/499
[58] Field of Search .......... 423/473, 474, 499, 659, 423/240, 241; 261/115, 126, 112; 159/48 R; 252/187 H

[56] References Cited

U.S. PATENT DOCUMENTS

| | | | |
|---|---|---|---|
| 2,170,108 | 8/1939 | Barton | 423/473 |
| 2,240,342 | 4/1941 | Muskat et al. | 423/474 |
| 2,889,874 | 6/1959 | Gauvin | 159/48 R |
| 3,131,212 | 4/1964 | Biller | 423/659 |
| 3,969,546 | 7/1976 | Saeman | 423/474 |

FOREIGN PATENT DOCUMENTS 543944  3/1942  United Kingdom .................. 423/473

*Primary Examiner*—Brian Hearn
*Attorney, Agent, or Firm*—Donald F. Clements; James B. Haglind

[57] ABSTRACT

A process for preparing hypochlorous acid is described in which gaseous chlorine is reacted with an aqueous solution of alkali metal hydroxide in a finely divided mist form at an elevated temperature sufficient to prevent condensation of the gaseous product. Gaseous hypochlorous acid product is immediately separated from the resulting solid alkali metal chloride as it is formed and is then scrubbed with water to form an aqueous hypochlorous acid solution. This solution may be reacted with lime to produce calcium hypochlorite.

22 Claims, No Drawings

HYPOCHLOROUS ACID PROCESS

This invention relates to the preparation of hypochlorous acid by a spray-mist technique.

Hypochlorous acid is used extensively in the preparation of chlorohydrin and chloramines, such as chloroisocyanurates.

One technique for preparing hypochlorous acid is described in British Pat. No. 543,944, which issued Mar. 20, 1942. In this process, chlorine, steam and air are bubbled through an aqueous solution of an alkaline earth metal hypochlorite such as calcium hypochlorite to remove the resulting hypochlorous acid in vapor form, which is then condensed and stored for use. This technique, however, also produces a large volume of calcium chloride, an undesirable by-product.

U.S. Pat. No. 1,403,993, which issued Jan. 17, 1922 to Wallace et al, describes a process in which an excess of aqueous caustic solution is used to scrub chlorine gas. The available chlorine content of such solutions is only about 5 percent and any hypochlorous acid which may form is converted to sodium hypochlorite.

U.S. Pat. No. 1,748,897, which issued to Oppe on Feb. 25, 1930, described a process for preparing a solid mixture of alkali metal hypochlorite and alkali metal chloride by reacting chlorine gas with a spray of alkali metal hydroxide, while cooling the reactants and product to effect condensation. The product of this technique is a solid mixture of alkali metal hypochlorite and alkali metal chloride, which has very limited utility.

A batch process for the preparation of sodium hypochlorite is disclosed in U.S. Pat. No. 1,850,975 which issued Mar. 22, 1932, to J. C. Baker. In this process, a measured quantity of aqueous sodium hydroxide solution is prepared and a measured quantity of chlorine gas is then slowly dispersed in the solution to produce an aqueous sodium hypochlorite solution.

Although all of these processes react gaseous chlorine with an alkaline hydroxide solution, none of them produce a stable hypochlorous acid product economically.

There is a need in the industry for an improved process for preparing hypochlorous acid in which the hypochlorous acid product is quickly separated from the reactant mixture to improve the stability and yield of the resulting hypochlrous acid product.

It is a primary object of this invention to provide an improved process for preparing hypochlorous acid in which the yield of undesirable by-products is substantially reduced.

It is another object of this invention to provide an improved process for preparing a hypochlorous acid directly from gaseous chlorine.

Still another object of the invention is to provide an improved process for preparing hypochlorous acid in which the product is immediately separated from the reactants as it is formed.

These and other objects of the invention are accomplished in a process in which gaseous chlorine is reacted with an aqueous solution of an alkali metal hydroxide in finely divided mist form at an elevated temperature sufficient to effect vaporization of hypochlorous acid as it forms, and separating the vaporized hypochlorous acid from the resulting solid alkali metal chloride product.

More in detail, the reaction is carried out in a suitable reactor, such as one provided with means for spraying a finely divided mist of an aqueous solution of an alkali metal hydroxide into the reactor, generally near the top, means for feeding gaseous chlorine in or near the top thereof, means for withdrawing solid alkali metal chloride product from or near the bottom of the reactor, and means for withdrawing a vapor stream comprised of hypochlorous acid, unreacted chlorine and water from or near the bottom of the reactor. The reactor, reactant feed lines or both are provided with suitable heating means for maintaining the reaction at a temperature sufficiently high to vaporize the hypochlorous acid product and water.

Any alkali metal hydroxide capable of reacting with gaseous chlorine to form hypochlorous acid may be employed as a reactant in the process of this invention. Typical examples of suitable alkali metal hydroxide include sodium hydroxide, potassium hydroxide, lithium hydroxide and mixtures thereof. Sodium hydroxide is the preferred reactant since the resulting sodium chloride by-product is more easily disposed of than the other alkali metal chlorides.

The alkali metal hydroxide is fed to the reactor as an aqueous solution or solid in finely divided form. It is preferable to employ the highest concentration of alkali metal hydroxide possible to minimize energy required to evaporate water from the solid alkali metal chloride product. Generally, the concentration of alkali metal hydroxide ranges from about 10 to about 80 and preferably from about 45 to about 70 percent alkali metal hydroxide by weight. More dilute or more concentrated solutions or slurries, or finely divided alkali metal hydroxide solids may be employed, if desired.

The reactor is provided with at least one atomizer for spraying the alkali metal hydroxide into the reactor, at or near the top. The atomizer forms a finely divided mist of the alkali metal hydroxide solution in the reactor for reaction with the gaseous chlorine contained therein. Droplet sizes which provide the maximum surface to volume ratio attainable are the preferred form of the alkali metal hydroxide solution. Droplets having an average diameter of less than about 1000 microns, perferably less than about 300 and more preferably less than about 100 microns are employed in the reaction. Any atomization technique capable of providing such droplets is employed to feed the aqueous alkali metal hydroxide solution to the reactor. Solid alkali metal hydroxide particles within the size range of the droplets may be employed.

Typical atomizing techniques of the pneumatic, hydraulic and spinning disc type, among others, which are suitable for use in the process of this invention, are described in the monograph entitled "Atomization and Spray Graining" by W. R. Marshall, Jr., Chemical Engineering Progress Monograph Series, No. 2, Vol. 50, 1954. A gas such as chlorine gas or an inert gas such as air, nitrogen or mixtures thereof under pressure is used to atomize droplets of aqueous alkali metal hydroxide by premixing before discharge from the nozzle, or mixing after discharge of the liquid and gas from their respective nozzles in a pneumatic atomizer. Sufficient chlorine gas to react with the alkali metal hydroxide may be mixed with an inert gas such as air or nitrogen and fed to the atomizer or to the reactor.

At least one atomizer is employed in the reactor which is positioned away from the reactor wall a sufficient distance to permit substantially complete reaction of the droplets of alkali metal hydroxide with chlorine before contacting the reactor walls. Any reactor design and atomizer position which permits reaction of the gas and droplets before contacting the wall or floor of the reactor may be employed, preferably with a minimum of residence time.

The atomizer is preferably positioned along the central axis of a cylindrical reactor, with minimum contact between the mist and the walls. The atomizer may be directed up, down, sideways or any other orientation that meets the above conditions.

For example, as described above, a spray of aqueous alkali metal hydroxide solution from an atomizer positioned in or near the top of the reactor is passed co-current with a flow of chlorine gas fed at or near the top of the reactor. In another embodiment, the aqueous alkali metal hydroxide solution is atomized with chlorine gas under pressure at or near the top of the reactor. The reactor is provided with a suitable grid to retain the solid alkali metal chloride particles which form, while permitting withdrawal of the vaporized hypochlorous acid from the bottom of the reactor. If desired, the gas and droplets may be fed at the bottom of the reactor and the gas is removed at the top. In another embodiment, the mixture of gas and solid may be conveyed from the reactor and separated in a separate container or apparatus, such as a cyclone or the like.

If the droplets are too large in diameter, there is a gradual decrease in the yield of the hypochlorous acid product. As indicated in the prior art, chlorinating an aqueous solution of caustic which is not in droplet form results in poor yields of hypochlorous acid because of the instability of the hypochlorous acid in the salt solution.

Gaseous chlorine is fed to the reactor at a rate sufficient to provide at least the stoichiometric proportion, and preferably a stoichiometric excess of chlorine above that proportion necessary to form hypochlorous acid with all of the alkali metal hydroxide present in the mist. Generally, from about 1 to about 20 and preferably from about 5 to about 10 times the stoichiometric proportion of chlorine is employed as a reactant.

The reactor is provided with heating means, either external or internal, which maintains the temperature in the reactor sufficiently high to vaporize the hypochlorous acid as it is formed. Generally, this temperature is at least 100° C. at atmospheric pressure. Although temperatures as high as 200° C. may be employed, it is preferable to employ temperatures in the range from about 75° C. to about 150° C. at atmospheric pressure or less. Lower temperatures may be employed at lower pressures. If the temperature is too low, the hypochlorous acid will remain in the droplets, in which phase it is highly unstable, thereby reducing the final yield of the desired hypochlorous acid.

The pressure in the reactor is generally maintained above the remainder of the system to provide sufficient head to convey vaporized hypochlorous acid from the reactor to a suitable scrubber which is capable of forming an aqueous solution of hypochlorous acid. Generally, the pressure in the reactor ranges from about 5 to about 100 psia, and preferably from about 10 to about 20 psia. However, higher or lower pressures may be employed if desired.

The reaction time between the gaseous chlorine and finely divided mist of alkali metal hydroxide is virtually instantaneous, and the resulting hypochlorous acid vapors are withdrawn continuously from the reactor as soon as they are formed. These vapors are conveyed to a suitable scrubber where they are placed in counter-current flow with water or other scrubbing solution to produce a hypochlorous acid solution containing from about 0.1 to about 12 and preferably from about 1 to about 7 molar hypochlorous acid. If desired, an inert organic solvent, such as carbon tetrachloride, may be employed, but solvent handling costs may adversely affect the process economics. The gaseous phase discharged from the top of the scrubber contains chlorine which may be recycled to the hypochlorous acid reactor.

The temperature of the scrubbing stage is generally maintained in the range from about 0 to about 30° C. and preferably from about 10 to about 15° C. At temperatures below about 9.6° C. there is a tendency to form chlorine octahydrate which is insoluble in cold water and precipitates in the scrubber, which diminishes the proportion of recycled chlorine. Any convenient pressure may be employed in the scrubber, but a pressure less than the rector pressure is desired in order to provide sufficient pressure differential to convey the hypochlorous acid vapors from the reactor to the scrubber. If desired, two or more stages may be employed in the scrubbing operation, wherein the gaseous discharge from the first scrubber is conveyed to the inlet of a second scrubber and the enriched scrubber liquor discharged from the second scrubber is used as the aqueous medium which is fed to the inlet of the first scrubber for scrubbing the hypochlorous acid vapors fed to the bottom of the first scrubber.

The solid alkali metal chloride product produced in the reactor is withdrawn from the reactor and then conveyed to storage or used in the preparation of brine for electrolysis or other use.

The aqueous hypochlorous acid produced by the process of this invention may be used in conventional reactions such as the preparation of chlorohydrin and chloramines. It is especially useful in the preparation of calcium hypochlorite by an improved process. In this process for preparing calcium hypochlorite, the aqueous hypochlorous acid from the scrubber is reacted with finely divided lime under ambient conditions to produce a slurry comprised of a calcium hypochlorite solution containing insoluble impurities derived from the lime. Sufficient hypochlorous acid is employed to effect the formation of calcium hypochlorite in accordance with Equation 1.

(1) $2HOCl + Ca(OH)_2 \rightarrow Ca(OCl)_2 + 2H_2O$

Hypochlorous acid equivalent to approximately the stoichiometric proportion is preferably employed.

The pH of the lime-hypochlorous acid reaction is generally maintained within the range from about 9.5 to about 12.5 and preferably from about 10 to about 12. The temperature and pressure conditions for this reaction are generally maintained near ambient conditions.

The resulting slurry is then filtered or otherwise processed to remove the insoluble muds which are derived from lime and which include insoluble compounds of iron, aluminum, silicon, calcium and magnesium. The resulting clarified solution of calcium hypochlorite is then conveyed to a suitable chlorinator where it is reacted with additional lime, sodium hydroxide and chlorine. However, if the raw lime is relatively pure, the initial reaction between lime and hypochlorous acid to produce insolubles may be omitted entirely or in part, and the hypochlorous acid solution is reacted with lime, chlorine and caustic to form an aqueous slurry of calcium hypochlorite crystals.

The proportions of reactants and the reaction conditions necessary to effect the preparation of an aqueous slurry of calcium hypochlorite in this reaction is disclosed in U.S. Pat. No. 3,895,099, which issued July 15, 1975, to W. J. Sakowski. This patent is incorporated by reference in its entirety in this application to illustrate typical reaction conditions which may be employed in the preparation of calcium hypochlorite in the process of this invention. Additional reactions which occur in the preparation of calcium hypochlorite by this technique are illustrated by the following equations:

(2) $Ca(OH)_2 + Cl_2 \rightarrow \frac{1}{2}Ca(ClO)_2 \cdot 2H_2O + \frac{1}{2}CaCl_2$ (3) $2NaOH + Cl_2 \rightarrow NaClO + NaCl + H_2O$ (4) $NaClO + \frac{1}{2}CaCl_2 \rightarrow \frac{1}{2}Ca(ClO)_2 + NaCl$ The resulting aqueous calcium hypochlorite slurry is further treated to recover the calcium hypochlorite product in dry granular form. One embodiment of this invention employs a spray dryer of the type described in U.S. Pat. No. 2,901,435, which issued Aug. 25, 1959, to H. L. Robson, which is hereby incorporated by reference. An aqueous slurry of calcium hypochlorite is fed to a spray drying chamber and the resulting droplets are contacted with hot inert gas such as air, having an inlet gas temperature in the range for example from about 200 to about 235° C. and an outlet gas temperature in the range from about 70 to about 95° C. to form dry granular particles of calcium hypochlorite.

In another embodiment of the invention, the concentration of the aqueous calcium hypochlorite slurry is adjusted by evaporation or otherwise to a water content of from about 45 to about 90, and preferably from about 50 to about 60 percent by weight of water. The resulting aqueous calcium hypochlorite slurry is conveyed to a rotary spray grainer or a fluidized bed spary grainer of the type described in U.S. Pat. No. 3,969,546, which issued July 13, 1976, to W. C. Saeman, which is hereby incorporated by reference in its entirety. In this technique, strong rounded granules of calcium hypochlorite are prepared which resist degradation and dusting when subjected to severe handling conditions.

The granular calcium hypochlorite product of either the spray drying technique or the spray graining technique may be further dried, if desired, in a conventional rotating dryer to produce a granular calcium hypochlorite product having a water content ranging from about 0.1 to about 15 and preferably from about 1 to about 12 percent by weight.

The process for preparing hypochlorous acid by this invention can be carried out continuously or batchwise.

The following examples are presented to define the invention more fully without any intention of being limited thereby. All parts and percentages are by weight unless otherise specified.

EXAMPLE 1

A three gallon glass reactor was employed in the preparation of hypochlorous acid by the process of this invention. An atomizer comprised of a six millimeter outside diameter glass tube which had been drawn to a capillary tip was inserted and secured inside of an eight millimeter outside diameter tube. A 50 percent aqueous solution of sodium hydroxide was convyed through the inner tube and chlorine was delivered through the outer concentric capillary at the rate of about 4 to 5 grams per minute at a pressure of from about 10 to about 30 psig. The chlorine gas served to atomize the aqueous sodium hydroxide solution, using about two times the stoichiometric proportion of chlorine necessary for the reaction. The reactor was heated with external electric heating means to a temperature of from about 100–105° C. The reactants were fed to the reactor over a period of about one hour during which time 185 grams of 50 percent sodium hydroxide solution (2.27 moles) were charged to the reactor. The vapors were vented from the reactor to an ice water scrubber and the aqueous hypochlorous acid solution was collected. Analysis of the scrubber liquor showed 1.33 moles of hypochlorous acid to be present and anaylsis of the solid salt residue in the reactor showed 0.34 moles of unreacted caustic. This corresponded to hypchlorous acid recovery corresponding to 69 percent of theory.

EXAMPLES 2, 3 and 4

A procedure similar to Example 1 was employed to prepare more concentrated hypochlorous acid solutions. An excess of 200 percent of the stoichiometric proportion of chlorine was employed and a two scrubber system was employed wherein each scrubber was maintained at about 10° C. Analysis of the scrubber solutions are set forth below in Table 1.

TABLE 1

| | | HOCl ANALYSIS | | | |
| | | SCRUBBER 1 | | SCRUBBER 2 | |
| EXAMPLE | WATER HEEL, MILLILITERS | MOLAR | PERCENT YIELD | MOLAR | PERCENT YIELD |
| --- | --- | --- | --- | --- | --- |
| 2 | 800 | 2.03 | 82.5 | 0.03 | 2.4 |
| 3 | 300 | 5.33 | 57.5 | 0.46 | 14.3 |
| 4 | 0 | 6.30 | 38.6 | 1.0 | 31.6 |

It can be seen from this series of Examples that the concentration hypochlorous acid in Scrubber 1 increases as the volume of water heel is decreased, under the conditions of these Examples. In addition, it can be seen that as the hypochlorous acid concentration of Scrubber 2 is increased, the hypochlorous acid in scrubber 1 also increases, but the overall yield decreases.

EXAMPLE 5

The procedure of Example 4 was repeated except that the temperature of the scrubbers was maintained in the range from about −5 to about 0° C. The concentration of the hypochlorous acid in Scrubber 1 was increased to 7.8 molar hypochlorous acid. In addition, the overall yield was increased from 70.2 to 72.2 percent.

EXAMPLE 6

An aqueous hypochlorous acid solution (3.5 molar) and granular calcium hypochlorite were prepared in accordance with the process of this invention.

A reactor was employed which was provided with an external heating means, a spray nozzle means in the top for conveying chlorine and an aqueous 50 percent sodium hydroxide solution in finely divided droplet form, and a means for withdrawing Hypochlorous acid vapors from the bottom of the reactor. Fresh gaseous chlorine (83.5 parts per hour) was admixed with recycled gaseous chlorine (167.0 parts per hour) and the resulting mixture was fed to the top of the reactor by means of an atomizer in which chlorine gas was used to atomize an aqueous 50 percent sodium hydroxide solution from a nozzle. The nozzle provided a mist of aqueous sodium hydroxide solution (75.6 parts per hour) in which the droplets had a calculated average diameter of about 4 microns.

The temperature of the reactor was maintained by means of the electric heater at a temperature of about 105° C. Solid sodium chloride, which was produced as a byproduct, was removed from the reactor at the rate of about 54.1 parts per hour. Microscopic examination of this salt showed that the particle size of this salt ranged from 5 microns down to substantially less than about 1 micron. The vapor phase was removed from the bottom of the reactor at the rate of about 270.3 parts per hour. This vapor phase contained about 39.5 parts of water, about 188.3 parts of chlorine, about 42.1 parts of hypochlorous acid, about 1.76 parts of oxygen, with the remainder being minor impurities. This vapor was fed to a two-stage scrubber system in which water was used in counter-current flow to the vapor stream to produce an aqueous hypochlorous acid solution. Water was fed to the top of the second-stage scrubber at the rate of about 162.5 parts per hour, which was maintained at a temperature of about 10° C. Chlorine gas was recovered from the top of the second-stage scrubber and recycled at the rate of 167 parts per hour to the initial rector. The liquid from the bottom of the second-stage scrubber, which contained about 0.23 percent by weight of hypochlorous acid, was conveyed to the top of the first scrubber stage at the rate of about 164.6 parts per hour. The vapor phase from the top o te first-stage scrubber, which was predominantly chlorine, was conveyed at the rate of 190.3 parts per hour to the bottom of the second-stage scrubber. An aqueous hypochlorous acid solution was recovered from the bottom of the first-stage scrubber at the rate of 244.6 parts per hour. This solution contained approximately 17 percent hypochlorous acid by weight (3.5 molar). This product was relatively free of impurities and was highly stable under standard storage conditions.

This hypochlorous acid solution was reacted with lime (31.4 parts per hour) in a neutralizer at a pH of about 11 and a temperture of about 25° C. The resulting slurry was filtered to remove insolubles, and the resulting clarified solution of calcium hypochlorite was reacted (274.2 parts per hour) with chlorine (21.0 parts per hour), an aqueous 50 percent sodium hydroxide solution (23.7 parts per hour) and lime (19.0 parts per hour). The chlorinator was maintained at a temperature of about 25° C. The resulting calcium hypochlorite slurry was withdrawn from the chlorinator (319.9 parts per hour) and approximately one-half (160.0 parts per hour) of the slurry was partially dried in a spray dryer at a temperature of about 75° C. Partially dried granules were admixed with the remaining one-half of the calcium hypochlorite slurry to produce a slurry which contained 35 percent by weight of calcium hypochlorite solids. This slurry was fed to a rotary spray grainer of the type described in U.S. Pat. 3,969,546 at the rate of 220.8 parts per hour. This slurry had the following analysis in terms of parts per hour:

TABLE 2

| COMPONENT | PARTS PER HOUR |
|---|---|
| Water | 121.5 |
| Lime | 2.2 |
| Insolubles | 0.5 |
| Calcium Hypochlorite | 77.9 |
| Sodium Chloride | 17.3 |
| Calcium Chlorate | 0.6 |
| Calcium Chloride | 0.8 |
| Total | 220.8 |

The temperature in the spray grainer was maintained at about 44° C. Sufficient water was removed in the spray grainer to produce calcium hypochlorite granules containing about 57.5 percent calcium hypochlorite. These granules were fed at the rate of about 131.8 parts per hour to a rotary dryer maintained at a temperature of about 70° C. to reduce the moisture content to about 1.5 percent and yield granular calcium hypochlorite containing about 74.0 percent calcium hypochlorite at the rate of about 100 parts per hour.

EXAMPLE 7

Hypochlorous acid (3.5 molar) was prepared in accordance with the procedure of Example 6 and reacted with lime in substantially equal molar porportions to produce a slurry of aqueous calcium hypochlorite solution containing insoluble mud suspended therein. The insoluble muds were separated by filtration and 30 percent additional raw line (11.6 parts per hour) was added along with 50 percent aqueous sodium hydroxide solution (50 parts per hour) and then chlorinated (82 parts per hour) to produce an aqueous slurry of calcium hypochlorite. This slurry, with a small amount of additional lime was evaporated and vacuum dried to produce a solid cake which was broken into granules of calcium hypochlorite. Analysis of the granules was as follows:

TABLE 3

| COMPONENTS | PERCENT BY WEIGHT |
|---|---|
| $Ca(OCl)_2$ | 70.0 |
| $Ca(ClO_3)_2$ | 2.1 |
| $Ca(OH)_2$ | 2.4 |
| $CaCl_2$ | 1.9 |
| NaCl | 16.9 |
| Insolubles | 0.8 |
| $H_2O$ | 5.4 |

EXAMPLE 8

An aqueous hypochlorous acid solution (6molar) and granular calcium hypochlorite were prepared in accordance with the process of this invention. A reactor was employed which was provided with an external heating means, a spray nozzle means in the top for conveying chlorine and an aqueous 50 percent sodium hydroxide solution in finely divided droplet form, and a means for withdrawing hypochlorous acid vapors from the bottom of the rector. Fresh gaseous chlorine (87.7 parts per hour) was admixed with recycled gaseous chlorine (206.1 parts per hour) and the resulting mixture was fed to the top of the reactor by means of an atomizer in which chlorine was used to atomize an aqueous 50 percent sodium hydroxide solution from a nozzle. The nozzle provided a mist of finely divided droplets of aqueous sodium hydroxide solution (85.8 parts per hour).

The temperature of the reactor was maintained by means of the electric heater at a temperature of about 105° C. Solid sodium chloride, which was produced as a byproduct, was removed from the reactor at the rate of about 63.3 parts per hour. The vapor phase was removed from the bottom of the reactor at the rate of about 316.4 parts per hour. This vapor phase contained about 44.9 parts of water, about 211.6 parts of chlorine, about 47.8 parts of hypochlorous acid, about 11.3 parts of oxygen, with the remainder being minor impurities. This vapor was fed to a two-stage scrubber system in which water was used in counter-current flow to the vapor stream to produce an aqueous hypochlorous acid solution. Water was fed to the top of the secondstage scrubber at the rate of about 56.4 parts per hour, which was maintained at a temperture of about 10° C. Chlorine gas was recovered from the top of the second-stage scrubber and recycled at the rate of 206.1 parts per hour to the initial reactor. The liquid from the bottom of the second-stage scrubber, which contained about 8.2 percent by weight of hypochlorous acid, was conveyed to the top of the first scrubber stage at the rate of about 64.8 parts per hour. The vapor phase from the top of the first stage scrubber, which ws predominantly chlorine, was conveyed at the rate of 224.5 parts per hour to the bottom of the second-stage scrubber. An aqueous hypochlorous acid solution was recovered from the bottom of the first-stage scrubber at the rate of 143.9 parts per hour. This solution contained approximately 6 molar hypochlorous acid, was relatively free of impurities and was highly stable under standard storage conditions.

This hypochlorous acid solution was reacted with lime (31.4 parts per hour) in a neutralizer at a pH of about 11 and a temperature of about 25° C. The resulting slurry was filtered to remove insolubles, and the resulting clarified solution of calcium hypochlorite was reacted (174.5 parts per hour) with chlorine (21.0 parts per hour), an aqueous 50 percent sodium hydroxide solution (23.7 parts per hour) and lime (12.3 parts per hour). The chlorinator was maintained at a temperture of about 25° C. The resulting calcium hypochlorite slurry was withdrawn from the chlorinator (232.8 parts per hour). This slurry was fed to a rotary spray grainer of the type described in U.S. Pat. No. 3,969,546 at the rate of 220.8 parts per hour. This slurry had the following analysis in terms of parts per hour:

TABLE 4

| COMPONENT | PARTS PER HOUR |
|---|---|
| Water | 133.4 |
| Lime | 1.4 |
| Insolubles | 1.8 |
| Calcium Hypochlorite | 77.9 |
| Sodium Chloride | 17.3 |
| Calcium Chlorate | 0.4 |
| Calcium Chloride | 0.6 |
| Total | 232.8 |

The temperature in the spray grainer was maintained at about 45° C. Sufficient water was removed in the spray grainer to produce calcium hypochlorite granules containing about 57 percent calcium hypochlorite. These granules were fed at the rate of about 131.8 parts per hour to a rotary dryer maintained at a temperature of about 70° C. to reduce the moisture content to about 1.5 percent and yield granular calcium hypochlorite containing about 74.0 percent calcium hypochlorite at the rate of about 100 parts per hour.

What is desired to be secured by letters of patent is:

1. A process for preparing hypochlorous acid which comprises:
   a. reacting an aqueous solution of an alkali metal hydroxide in finely divided droplet form,
   b. with gaseous chlorine,
   c. to form hypochlorous acid
   d. and solid alkali metal chloride,
   e. at an elevated temperature to vaporize hypochlorous acid as it forms, and
   f. separating said vaporized hypochlorous acid from the resulting solid alkali metal chloride.

2. The process of claim 1 wherein said alkali metal hydroxide is selected from the group consisting of sodium hydroxide, potassium hydroxide, lithium hydroxide and mixtures thereof.

3. The process fo claim 2 wherein said alkali metal hydroxide is sodium hydroxide.

4. The process fo claim 2 wherein said alkali metal hydroxide is potassium hydroxide.

5. The process of claim 2 wherein said alkali metal hydroxide is lithium hydroxide.

6. The process of claim 2 wherein said elevated temperature is in the range from about 75 to about 150° C.

7. The process of claim 6 wherein the pressure of the reaction between said chlorine and said alkali metal hydroxide is maintained in the range from about 10 to about 20 psia.

8. The process of claim 7 wherein a stoichiometric excess of chlorine is employed.

9. The process of claim 8 wherein said stoichiometric excess is in the range from about 1 to about 20 times the stoichiometric proportion of chlorine necessary to form hypochlorous acid with said alkali metal hydroxide.

10. The process of claim 9 wherein said droplets have an average diameter of less than about 1000 microns.

11. The process of claim 6 wherein said droplets are formed by atomizing said solution with a gas selected from the group consisting of chlorine, air, nitrogen and mixtures thereof.

12. The process of claim 11 wherein said gas is chlorine.

13. The process of claim 12 wherein said gas is a mixture of chlorine and air.

14. The process of claim 6 wherein said vaporized hypochlorous acid containing unreacted chlorine is contacted with an aqueous medium to produce an aqueous solution of hypochlorous acid.

15. The process of claim 14 wherein said unreacted chlorine is separated from said aqueous hypochlorous acid and recycled for reaction with additional alkali metal hydroxide.

16. The process of claim 14 wherein said aqueous hypochlorous acid solution has a concentration of from about 0.1 to about 12 molar hypochlorous acid.

17. The process of claim 16 wherein said concentration if from about 1 to about 7 molar hypochlorous acid.

18. A process for preparing calcium hypochlorite which comprises:
   a. reacting an aqueous solution of an alkali metal hydroxide in finely divided droplet form,
   b. with gaseous chlorine,
   c. to form hypochlorous acid,
   d. and solid alkali metal chloride,
   e. at an elevated temperature to vaporize hypochlorous acid as it forms,
   f. separating said vaporized hypochlorous acid from the resulting solid alkali metal chloride, g. contacting said vaporized hypochlorous acid with an aqeuous medium to produce an aqueous solution of hypochlorous acid, h. said aqueous solution of hypochlorous acid is reacted with lime, chlorine and alakli metal hydroxide to produce an aqueous slurry of calcium hypochlorite, and i. dewatering said aqueous slurry to produce granular calcium hypochlorite particles.

19. The process of claim 18 wherein said dewatering is effected by spray drying said aqueous slurry of calcium hypochlorite.

20. The process fo claim 18 wherein said dewatering is effected by spray graining said aqueous slurry of calcium hypochlorite.

21. The process of claim 20 wherein said aqueous slurry of calcium hypochlorite is adjusted to a water concentration within the range of from about 45 to about 90 percent by weight of water prior to spray graining.

22. The process of claim 21 wherein the concentration of said aqueous slurry of calcium hypochlorite is adjusted within the range of from about 50 to about 60 percent by weight of water prior to said spray graining.

* * * * *

UNITED STATES PATENT AND TRADEMARK OFFICE
CERTIFICATE OF CORRECTION

PATENT NO. : 4,146,578
DATED : March 27, 1979
INVENTOR(S) : James P. Brennan, John A. Wojtowicz, and Preston H. Campbell It is certified that error appears in the above-identified patent and that said Letters Patent are hereby corrected as shown below:

Column 1, line 47, delete "hypochlrous" and insert --hypochlorous--.

Column 6, Examples 2, 3 & 4, line 34, after "two" insert --stage--.

Column 7, Example 6, line 3, delete "Hypochlorous" and insert --hypochlorous--.

Column 7, Example 6, line 39, delete "o te" and insert --of the--.

Column 8, Example 7, line 27, delete "porportions" and insert --proportions--.

Column 8, Example 7, line 31, delete "line" and insert --lime--.

Column 9, Example 8, line 24, delete "ws" and insert --was--.

Column 10, Claim 3, line 16, delete "fo" and insert --of--.

UNITED STATES PATENT AND TRADEMARK OFFICE
CERTIFICATE OF CORRECTION

PATENT NO. : 4,146,578
DATED : March 27, 1979
INVENTOR(S) : James P. Brennan, John A. Wojtowicz, and Preston H. Campbell It is certified that error appears in the above-identified patent and that said Letters Patent are hereby corrected as shown below:

Column 10, Claim 4, line 18, delete "fo" and insert --of--.

Column 12, Claim 20, line 1, delete "fo" and insert --of--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks